C. A. BAAL.
SIDEHILL PLOW.
APPLICATION FILED MAR. 23, 1915.
1,189,524.
Patented July 4, 1916.
2 SHEETS—SHEET 1.
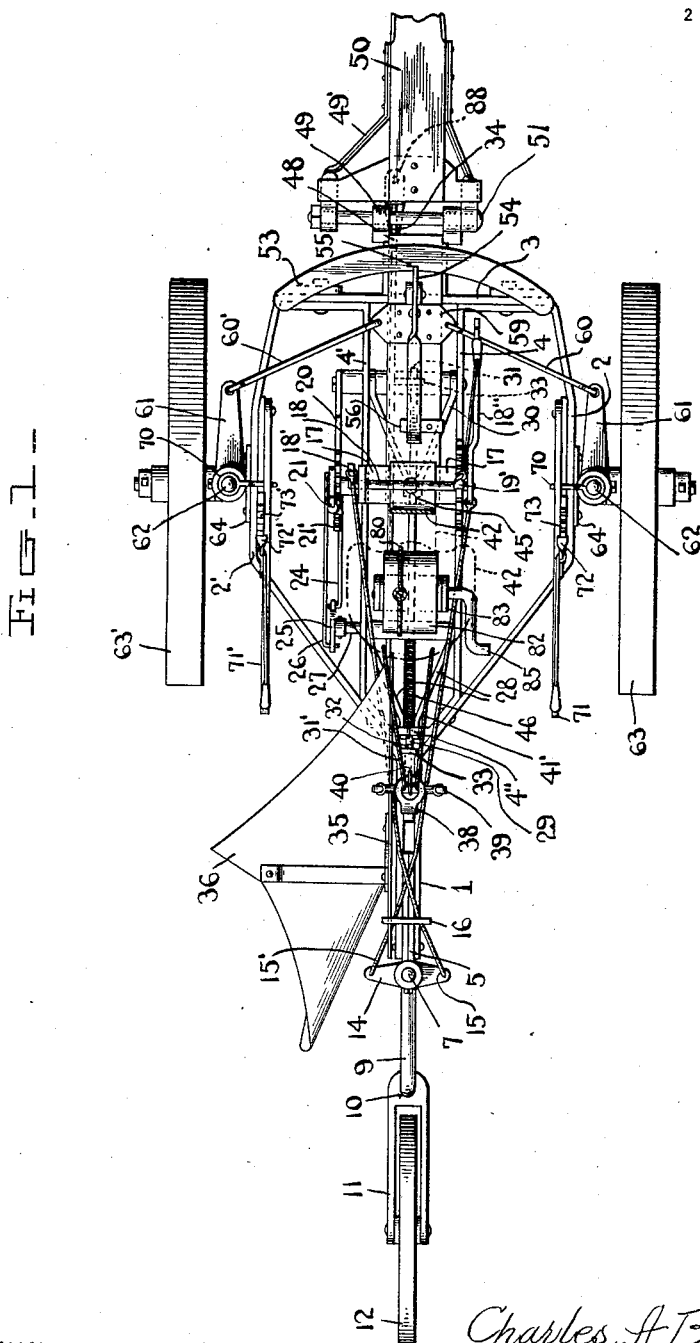
Witnesses
L. B. James
Frank Pierse
Inventor
Charles A. Baal
By M. M. Cady
Attorney C. A. BAAL.
SIDEHILL PLOW.
APPLICATION FILED MAR. 23, 1915.
1,189,524.
Patented July 4, 1916.
2 SHEETS—SHEET 2.
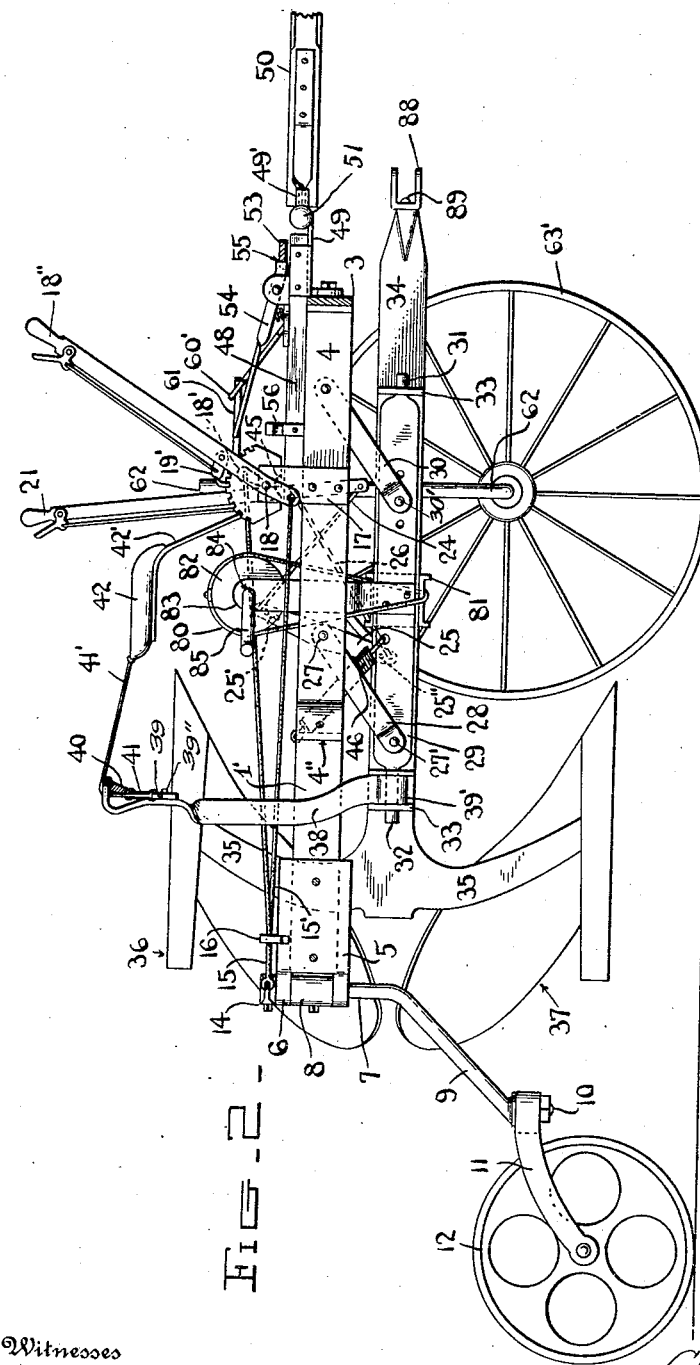
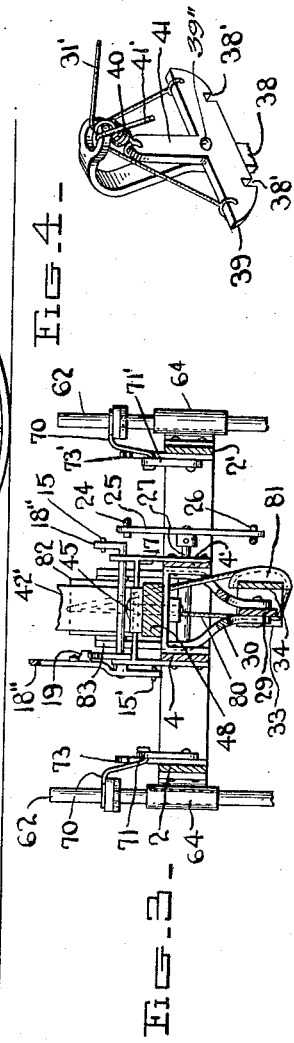
Witnesses
L. B. James
Frank Pierce
Inventor
Charles A. Baal
By M. M. Cady,
Attorney

UNITED STATES PATENT OFFICE.

CHARLES ARTHUR BAAL, OF SHERRILLS MOUNT, IOWA.

SIDEHILL-PLOW.

1,189,524.  Specification of Letters Patent.  Patented July 4, 1916.

Application filed March 23, 1915. Serial No. 16,456.

*To all whom it may concern:*

Be it known that I, CHARLES ARTHUR BAAL, a citizen of the United States, residing at Sherrills Mount, in the county of Dubuque and State of Iowa, have invented certain new and useful Improvements in Sidehill-Plows, of which the following is a specification.

The invention has particular reference to side hill plows, of the wheel type, wherein right and left hand plows are mounted on opposite sides of a partially rotatable beam so that either one or the other plow may be entered into the soil.

The invention further relates to means for causing the rear traction wheel to occupy a position on one or the other side of the longitudinal center of the machine according to which plow is operating; and still further to means for elevating either or both sides of the machine frame and for turning simultaneously both of the front traction wheel-standards regardless of the elevation of the frame.

Reference will be had to the accompanying drawing forming a part of this specification and wherein like characters of reference indicate corresponding parts throughout the several views, in which:

Figure 1 is a top plan view of the invention, Fig. 2 is a vertical longitudinal sectional view therethrough with parts shown in elevation, Fig. 3 is a transverse vertical sectional view, and Fig. 4 is a detail perspective view of the catch.

Referring to the drawings, reference numerals 1, 1' designate the rear parallel portions of the frame side bars, which merge into front parallel portions 2, 2', the latter considerably spaced apart and connected by a front bar 3. Within the main frame so formed, a U-shaped member is provided, the same consisting of parallel bars 4, 4' secured at their front ends to the front bar 3 and at their rear ends being connected together by a member 4" which in turn is connected to both the side bars 1, 1' of the main frame. Between the portions 1, 1' of the main frame is secured a bracket 5 which is provided with a bearing 6 in which is journaled a vertical pintle 7 provided with an adjustable stop collar 8. The lower end of pintle 7 merges into an oblique intermediate portion 9 which terminates in a vertical lower portion 10, the latter off-set from the upper portion 7. To the lower portion 10 is journaled a bracket 11 which extends rearwardly and has journaled therein the rear wheel 12. The upper end of the pintle 7 is provided with a steering yoke 14 having steering cords or other flexible elements 15, 15' connected thereto and passing through a guide 16 and being crossed over each other. A bracket 17 is secured to the bars 4, 4' and has journaled therein a cross shaft 18 provided at one end with a crank arm 18' having the steering cord 15 connected thereto and at its other end with a steering lever 18" having the other steering cord 15' connected thereto. Said steering lever 18" is provided with a hand controlled locking pawl 19' which co-acts with the teeth of a ratchet segment on said bracket 17. The cord 15 connects with its lever or arm 18' on the upper side of said shaft 18, while the cord 15' connects with the steering lever at a point below the axis of said shaft 18, thus the one lever 18" serves to simultaneously actuate said steering cords. By operating the steering lever, the crank formation of the pintle member 7 causes the lower end of said pintle to be swung to either selected side of the longitudinal axis of the machine, for a purpose to be hereinafter described.

To the frame bar 4' is secured a segment 20 with which is associated a plow lifting lever 21 having a hand operated locking pawl mechanism 21' to co-act with the teeth of the said segment 20. The lower end of this lever 21 at a point below its pivot has connected thereto a link 24, which connects at its rear end with one of the holes 25' in the upper end of an arm 25. A second link 26 connects with one of the holes 25" in the lower end of said arm 25, which arm is centrally secured to a rock shaft 27 journaled in the bars 4, 4', and the forward end of said link 26 connected with said lifting lever 21 at a point above the pivotal point of said lifting lever. The said rock shaft 27 is provided with a depending arm 28 which is pivotally connected at its lower end 27' with a horizontal bar 29. At its forward end, said bar 29 is pivotally connected at 30' with depending arm 30 pivotally arranged at its upper end in the bars 4, 4'. The said arms 28 and 30 cause parallel relation of the said bar 29 with respect to the main frame when said bar 29 is raised and lowered by said lifting lever 21 and the intermediate mechanism. The forward and rear ends of this bar 29 are rounded as at 31, 32 respectively, and upon these rounded portions 31, 32 are journaled brackets 33 of a plow beam 34. The plow beam 34 is provided on opposite sides with standards 35, each provided with a plow. These plows are respectively right and left handed, being indicated respectively by numerals 36 and 37. The rounded portion 32 of the bar 29 passes loosely through the lower end of a vertical bracket 38, which passes between said portions 1, 1' of the main frame. To the upper end of this bracket 38 is pivoted at 39'' a double catch 39, maintained in central position by a coil spring 40 which is connected at its lower end to a vertical arm 41 provided centrally of said catch member 39. The upper end of said spring 40 connects with the upper end of said bracket 38. The catch on opposite sides of its pivot is provided with notches 38' which engages with one or the other of said plows 36 or 37 according to which thereof is not lowered into operative position. Releasing cords 41, 41' connect with opposite ends of the catch 39 and lead to a point within reach of the operator, in the present instance, being attached to the operator's seat 42. Said seat 42 is mounted on a supporting bracket 42' which is in turn mounted on said bracket 17 by means of a bolt 45, which also serves as a king bolt as will be described. The said bar 29 which supports the plow beam is normally held in its raised position by a coil spring 46 connected to said bar 29 and to the member 4''. To said king bolt 45 is pivotally connected a draw-bar 48 provided with a tongue coupling 49 through which and a coupling member 49' on the tongue 50, passes a coupling pin 51. The construction of the coupling member 49' is such that the tongue 50 may be shifted out of alinement with the draw-bar 48 when an unequal number of horses are connected with a clevis provided on the forward end of the plow beam 34.

The front frame bar 3 is provided thereabove with a segmental bar 53 between which and the said front bar 3 the draw bar 48 swings on its king bolt, and said draw bar is adapted to be locked in its central position, or in alinement with the longitudinal axis of the machine, by means of a spring pressed locking pawl 54 which engages with a central notch 55 in said segmental bar 53. When the pawl 54 is raised from said notch 55, it rides on the upper surface of the segmental bar 53, and upon return of the draw-bar 48 to central position, will enter said notch again, provided the rear end of said pawl 54 is released from a catch 56 on the draw-bar.

A double arm 59 is secured centrally to the draw-bar 48 and extends beyond opposite sides thereof. To the opposite extensions of this arm 59 are connected links 60, 60', each connecting at its outer end to the forward end of an arm 61, these two arms 61 being adjustably secured to the upper ends of vertical axles 62 having horizontal lower ends upon which are journaled the main traction wheels 63, 63'. The vertical axle portions 62 are journaled for vertical movement in bearings 64 provided on the main frame bars 2, 2'. Thus it will be seen that when the draw-bar 48 is swung to either side, the axle portions 62 will be correspondingly turned to guide the machine. Loosely surrounding the upper end of each vertical axle portion 62, and resting upon the arm 61 thereof, is a link 70, one for each axle. To the frame bar 2 is pivoted a hand lever 71 having a locking pawl 72 for engagement with the teeth of a segment 73, which latter is also secured to said frame bar 2. The frame bar 2' has a similar lever 71', pawl 72', and segment 73'. The link 70 of the axle of traction wheel 63 connects with the lever 71 above the pivotal point of the latter, and similarly, the link 70 of the axle of the wheel 63' connects with the other lever 71'. When it is desired to elevate either side of the machine frame, either lever 71 or 71' is operated to lift said frame, the link 70 forming a fulcrum for said lever.

The plows are reversed or operated by rocking the plow beam 34 by means of an endless cable or flexible member 80 passing around a segment 81 of the plow beam and around a drum 82. The latter is journaled in a bracket 83 secured at its lower end to the said bar 29 and extending upwardly between the frame members 4, 4'. In fact, the drum is mounted upon a shaft 84 journaled in said bracket 83 at the upper end of the latter, and said shaft 84 has a crank 85 directly beneath and to one side of the seat 42 within easy reach of the operator. When it is desired to change the plows, the operator releases the catch 39, when the weight of the upper plow causes the plow beam 34 to turn partly to raise the lower plow partly, and then by operating the drum 82 by means of its crank, the formerly upper plow is completely lowered and the formerly lowered plow completely raised and the raised plow automatically engaged with its respective notch of said catch 39.

In operation, the whiffletree of the team of horses is connected to a clevis 88 which is swiveled to the forward end of the plow beam 34 by a horizontal pivot pin 89 in a manner to permit partial rotation of the plow beam without interference with the proper position of the clevis. The tongue 50 merely serves as a guiding medium.

What is claimed:

1. In a wheel-plow, a main frame, a supporting bar beneath said frame, parallel links between said bar and said frame, means for raising and lowering said bar, a plow beam pivoted to said bar and parallel therewith, plows on opposite sides of said beam, means for partially rotating said beam to raise one plow and lower the other, a bracket on said bar, and a double catch on said bracket to engage either plow when same is in raised position.

2. In a wheel-plow, a main frame, a non-rotative supporting bar beneath said frame, means for raising and lowering said bar in parallelism with said frame, a bracket on said bar, a double catch on said bracket, a plow beam pivotally connected with said bar, plows on opposite sides of said beam, and means for partially rotating said beam to engage one or the other of said plows with said catch.

3. In a wheel plow, a main frame comprising parallel side members, a bar, a pair of parallel links connecting said bar to said main frame, said links being inclined downwardly and rearwardly, manually operated means for lowering said bar, means independent of said manual means for normally holding said bar elevated, a plow beam provided on opposite sides with plows, one right and the other left handed, said bar having rounded portions, said plow beam being pivotally connected to said rounded portions, a bracket mounted on one of said rounded portions and extending upwardly between said parallel frame members and supported thereby, and a double catch on the upper end of said bracket for engagement with one or the other of said plows when elevated, and means carried by said bar for partially rotating said plow beam.

4. In a wheel plow, a main frame, a plow non-rotative supporting frame parallel therewith, means for raising and lowering said supporting frame in parallelism with said main frame, a plow beam parallel with and pivotally connected to said supporting frame, plows on opposite sides of said plow beam, and a drum carried by said supporting frame and having connection with said plow beam to partially rotate the latter.

5. In a wheel-plow, a main frame, a plow supporting frame parallel therewith, means for raising and lowering said supporting frame in parallelism with said main frame, a plow beam parallel with and pivotally connected to said supporting frame, plows on opposite sides of said plow beam, a bracket extending upwardly from said supporting frame, a drum journaled in said bracket and provided with a hand operating means, and an endless belt passing over said drum and around said plow beam to partially rotate the latter.

6. In a wheel-plow, a main frame, a pair of opposite plows having an intermediate pivotal connection with said main frame, the axis of said pivotal connection being longitudinally disposed with respect to the said main frame, means for entering one of said plows into the soil at a point on one side of the vertical plane of said axis and the other plow on the other side of said plane, a rear wheel supporting the rear end of said main frame, and means for causing said wheel to operate on one or the other sides of said vertical plane according to which of said plows is operating.

7. In a wheel-plow, a main frame, a pintle journaled in the rear portion thereof and having a lower crank portion, a rear wheel connected to said crank portion and adapted to engage the ground on either side of the longitudinal center of said main frame, means for partially rotating said pintle in its bearing, a pair of opposite plows, and means for moving one of said plows to engage the soil on one side of said longitudinal center and the other to engage the soil on the other side of said longitudinal center.

8. In a wheel-plow, a main frame, a vertical axle extension journaled in said main frame for vertical movement, a shoulder fixed to the upper end of said axle extension, a link provided at one end with an aperture receiving the upper end of said axle extension, said link bearing upon said shoulder, a hand lever pivoted to said main frame, and the other end of said link being pivotally connected with said lever.

In testimony whereof I affix my signature in presence of two witnesses.

CHARLES ARTHUR BAAL.

Witnesses:
 WILLIAM GRAHAM,
 HARRY F. SALOT.